United States Patent [19]

Martens et al.

[11] 4,160,362

[45] Jul. 10, 1979

[54] GAS TURBINE AND COMBINED CYCLE POWER PLANT HAVING REDUCED EMISSION OF NITROGEN OXIDE AND IMPROVED COOLANT INJECTION FLOW CONTROL SYSTEM THEREFOR

[75] Inventors: Alan Martens, Wayne, Pa.; Thomas J. Radkevich, Wilmington, Del.; Jack R. Smith, Ross Township, Allegheny County, Pa.

[73] Assignee: Westinghouse Electric Corp., Pittsburgh, Pa.

[21] Appl. No.: 783,248

[22] Filed: Mar. 31, 1977

[51] Int. Cl.² .............................. F02C 7/02; F02C 9/02
[52] U.S. Cl. .................................. 60/39.18 B; 60/39.3; 60/39.55
[58] Field of Search .................. 60/39.05, 39.53, 39.55, 60/39.58, 39.59, 39.18 B, 39.3, DIG. 11

[56] References Cited

U.S. PATENT DOCUMENTS

| | | | |
|---|---|---|---|
| 3,100,964 | 8/1963 | Bevers et al. | 60/39.3 |
| 3,353,360 | 11/1967 | Gorzegno | 60/39.3 |
| 3,693,347 | 9/1972 | Kydd et al. | 60/39.55 |
| 3,826,080 | 7/1974 | De Corso et al. | 60/39.55 |
| 3,943,372 | 3/1976 | Smith et al. | 60/39.18 B |

*Primary Examiner*—Louis J. Casaregola
*Attorney, Agent, or Firm*—E. F. Possessky

[57] ABSTRACT

A combined cycle power plant includes a gas turbine and an afterburner to which fuel is supplied for speed and load control. Water is injected into the turbine combustors by a controlled water injection system to control total NOx emissions from the turbine and the afterburner as a function of turbine load corrected for changes in inlet air temperature and inlet guide vane position.

6 Claims, 13 Drawing Figures

GAS TURBINE AND COMBINED CYCLE POWER PLANT HAVING REDUCED EMISSION OF NITROGEN OXIDE AND IMPROVED COOLANT INJECTION FLOW CONTROL SYSTEM THEREFOR

CROSS-REFERENCE TO RELATED APPLICATIONS

The following prior coassigned patent applications are hereby incorporated by reference for total system disclosure purposes:

Ser. No. 495,765 filed Aug. 8, 1974 U.S. (Pat. No. 3,953,966), by L. F. Martz et al, entitled "Combined Cycle Electric Power Plant Having A Control System Which Enables Dry Steam Generator Operation During Gas Turbine Operation"; and Ser. No. 82,470 filed Oct. 20, 1970 (abandoned), by T. Giras et al, entitled "Improved System And Method For Operating Industrial Gas Turbine Apparatus And Gas Turbine Electric Power Plants Preferably With A Digital Computer Control System".

BACKGROUND OF THE INVENTION

The present invention relates to electric power plants having one or more gas turbines and more particularly to systems employed in such plants for controlling the emission of nitrogen oxide in the gas turbine exhaust.

Generally, the products of combustion of oil or natural gas include nitrogen oxide which is an undesirable pollutant. Thus, thermal nitrogen oxide (NOx) is formed from nitrogen in the air in or near the combustion zone. Organic NOx is formed during combustion from nitrogen bound in the fuel and accordingly is primarily a function of the fuel nitrogen content.

The amount of thermal NOx generated by the turbine depends on variables including the type of fuel, the air/fuel ratio and the combustor design. Since thermal NOx formation is also a function of flame temperature, it can be reduced by injecting a heat sink such as water or steam into the combustion zone. Various prior art patents have dealt with this subject.

In De Corso U.S. Pat. No. 3,826,080, for example, there is disclosed a mechanical system for injecting water into the combustors of a gas turbine. However, little specific disclosure is provided on the way in which the injection system operates.

As another example, Kydd U.S. Pat. No. 3,693,347 discloses a steam injection system which provides increased cycle efficiency by maximizing steam flow and increasing turbine mass gas flow. Maximum allowed steam flow is adjusted for high and low ambient temperatures.

None of the known prior art discloses a system in which coolant injection is controlled to provide only needed reductions in NOx production on the basis of the condition of predetermined variables. Thus, where demineralized water is used as the coolant, for example, the cost of the coolant itself can be prohibitive unless the coolant is used only according to need. Further, the independent injection of coolant into the combustion zone reduces combustion efficiency and increases mass flow to reduce cycle efficiency. Therefore it is desirable for efficiency reasons to provide only the coolant injection needed for reduction of NOx to the acceptable level, i.e. the national standard defined by the U.S. Environmental Protection Agency or a more restrictive state standard such as Rule 67 applicable in California.

SUMMARY OF THE INVENTION

An electric power plant comprises a gas turbine which drives an electric generator, a system for supplying fuel to combustors included as a part of the turbine, means for controlling the fuel flow to the combustors to control the turbine speed and load, a system for injecting water into the combustors to control the level of NOx emission, and means for controlling the water injecting system as a function of the load.

DESCRIPTION OF THE PREFERRED EMBODIMENT

Figure 1:
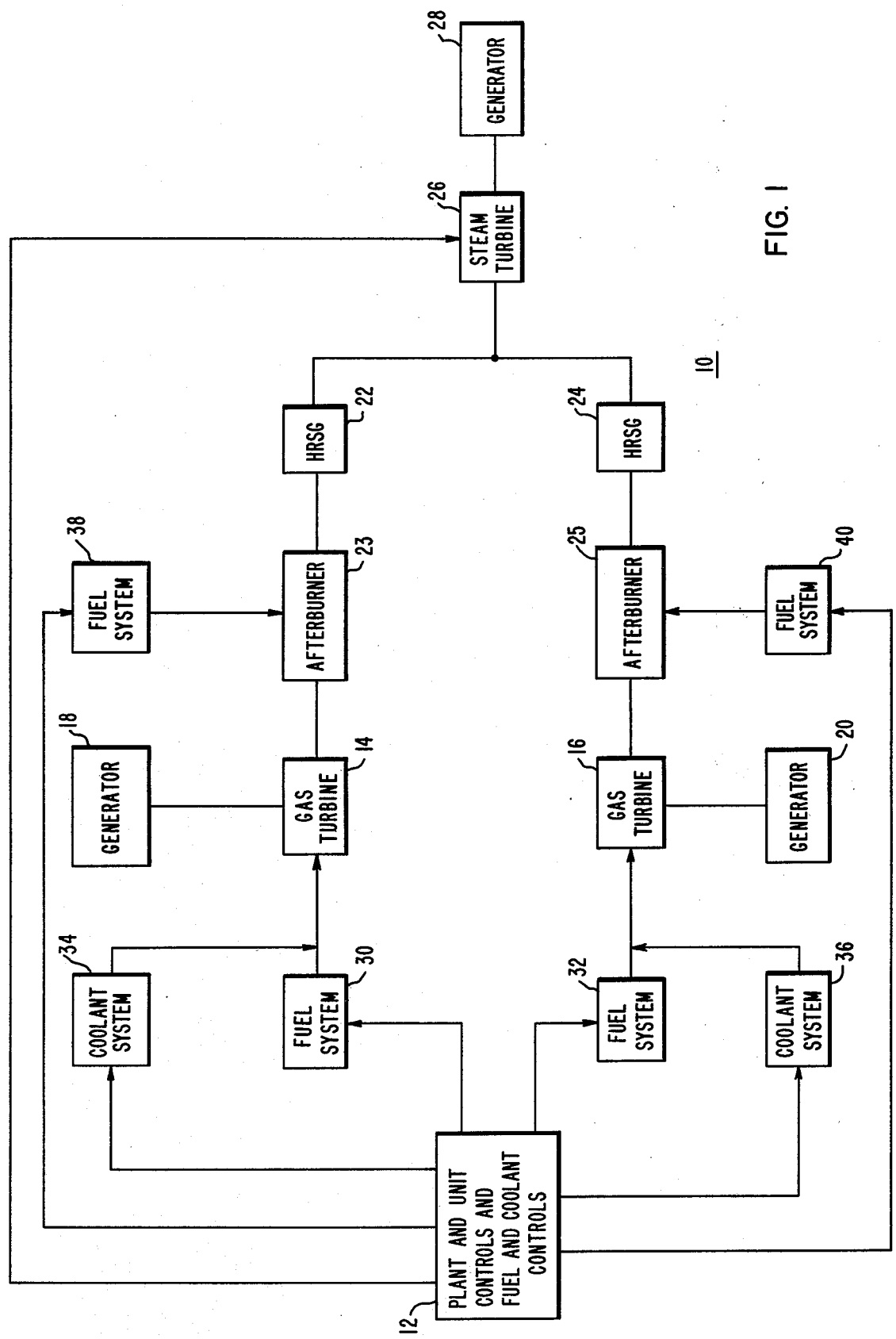
FIG. 1 shows a schematic diagram of a combined cycle plant arranged in accordance with the principles of the invention.

In FIG. 1, there is shown a combined cycle plant 10 which is operated by plant and unit controls and fuel and water controls 12 in accordance with the principles of the invention. As disclosed more fully in the cross-referenced patent applications, gas turbines 14 and 16 drive electric generators 18 and 20 and generate hot gas for the production of steam in heat recovery steam generators 22 and 24. Afterburners 23 and 25 provide supplemental heat for the gas. The steam operates a steam turbine 26 which also drives a generator 28. Breakers (not shown) connect the generators to the power system lines.

A gas/oil fuel system 30 supplies fuel to the gas turbine 14 under speed/load control. A like fuel system 32 provides fuel for the gas turbine 16. Respective coolant systems 34 and 36 are controlled to supply a coolant, preferably water, which is injected into the turbine combustion chambers to reduce the NOx level in the exhaust flows. The water is injected into the combustion chambers during load control operation through the atomizing air flow paths as set forth in U.S. Pat. No. 3,826,080 assigned to the present assignee.

During startup there is little need for water injection to control NOx since the operating temperatures are not high enough to be of concern. Above about 3000° F., however, thermal NOx does increase significantly.

Fuel systems 38 and 40 are controlled to supply gas or oil to the afterburners 23 and 25. Afterburner combustion also produces NOx, but, as explained more fully hereinafter, it is preferred that afterburner NOx be offset by water injection controlled decreases of NOx in the gas turbine combustors as opposed to providing a separate controlled water injection system for the afterburners.

In providing NOx emissions control, it is preferred that demineralized water be used for injection, and especially because of the high cost of such water it is desirable that the injection scheme make efficient use of the water. Efficiency of water use is also needed since the water flashes to steam on injection and therefore adds to the turbine mass flow and absorbs process heat which reduces the combustor temperature and the plant heat rate. Thus, it is desirable that use be made only of that amount of water (at rates of up to say 120 gal./min.) needed to achieve the desired NOx emissions control. Generally, heavy fuel bound N requires about twice as much water as does thermal N for NOx emissions control.

Although plant heat rate is reduced by water injection, it is noteworthy that maximum plant output can be increased by use of more fuel without exceeding plant design limits. In the prior art where steam is injected into the turbine combustors as in the aforementioned Kidde patent, it is desirable that the steam injection flow be as high as possible since the steam is adding heat to the process even though it reduces the combustor temperature.

The extent to which combustor temperature should be reduced depends on the temperature value and the amount of NOx reduction required. In turn, combustor temperature is a function of load and mass combustion air flow through the turbine. Changes in mass combustion air flow and resulting change in combustor temperature at a given level are caused by variations in inlet ambient air temperature and the inlet guide vane position. Thus, in the water injection control subsystem herein disclosed, the water injection requirements for thermal NOx are determined as a function of gas turbine load corrected for variations in compressor inlet temperature and inlet guide vane position. The water requirement is based on natural gas fuel with a correction if oil is being fired. The basic requirement is also corrected for fuel bound nitrogen and afterburner firing rate.

Figure 2:
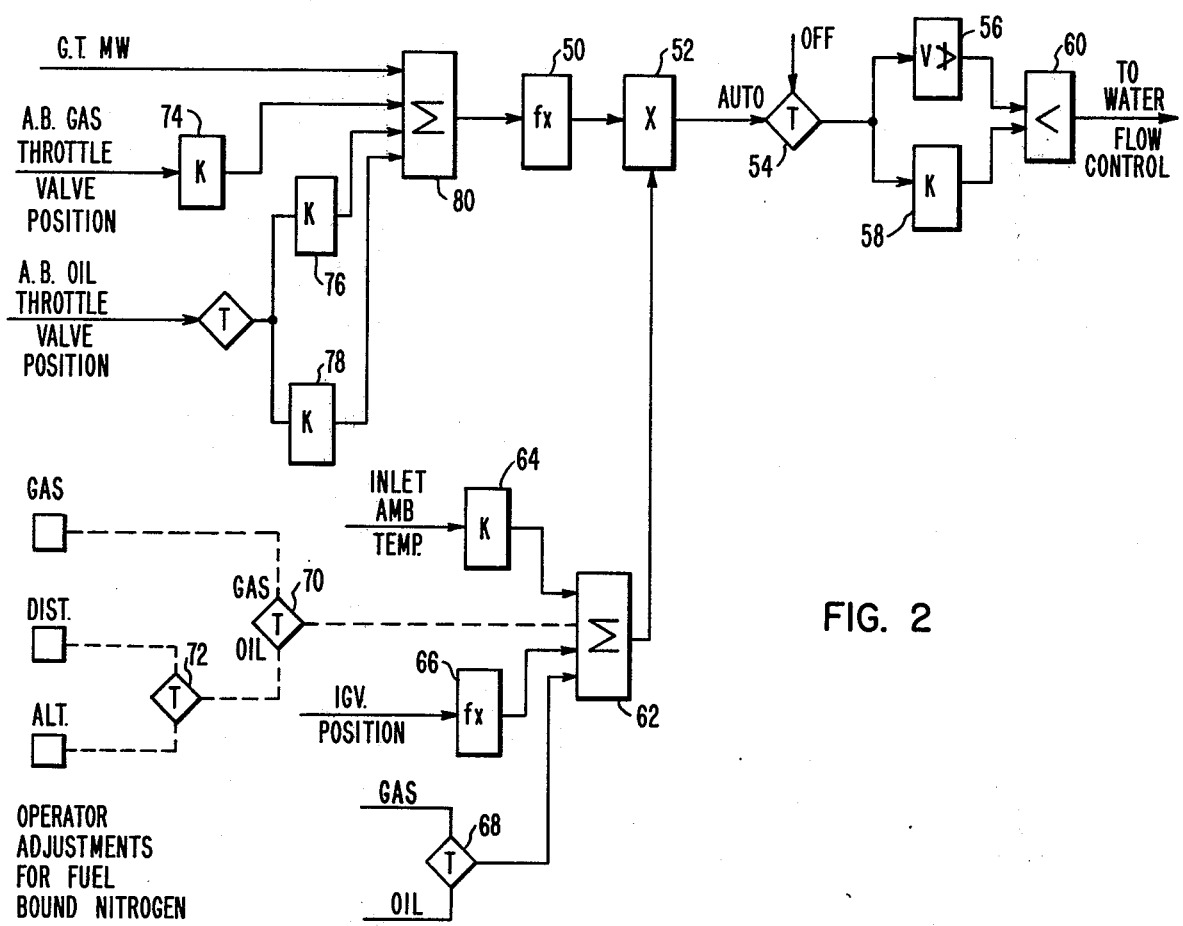
FIG. 2 shows a functional block diagram of a water injection control arranged in accordance with the principles of the invention.

As shown in FIG. 2 (and with some additional detail in FIG. 4C), a signal proportional to the gas turbine generator megawatts is characterized by a function generator 50, passes through a correctional multiplier 52 to an Auto-Off transfer function 54. If the system is on auto, the characterized and corrected load signal passes through function blocks 56, 58 and 60 to provide an output water injection control signal with velocity limiting or first order time lag for an increasing signal and no lag for a decreasing signal. In this way, injection water can be added slowly to prevent flame out and removed quickly in a contingency situation or in the case where water injection is turned off. See FIGS. 3C or 3G for total water injection flow as a function of plant power.

Generally, the amount of power derived from a given quantity of fuel decreases with increasing ambient temperature (see FIGS. 3A and 3B or 3E and 3F) or increased closure of the inlet guide vanes and corrective actions are thus required for these variables. Corrections for variations in inlet ambient temperature, changes in IGV position and a correction for the selected fuel are summed in box 62 and used as the multiplier constant in the multiplier 52. The inlet ambient temperature signal is applied to a proportional box 64 and then coupled to the summer 62. The IGV position is characterized by a function generator 66 which is coupled to the summer 62. A gas/oil transfer function 68, 70, 72 provides correction for fuel bound nitrogen according to whether gas or oil is used. Adjustable settings for the function generators 50 and gain constants (K) permit each shipped system to be optimized for its specific installation.

To reduce organic NOx the operator manually enters a value, which is a function of the fuel bound nitrogen, (FBN) for each fuel available to the turbine. The present system provides for one gas setting and two oil settings. Two transfers (T), which are set by fuel selection logic (not detailed) permit the proper FBN constant to be summed with the other corrections and be applied to the multiplier 62. See FIGS. 3D or 3H for the effect of FBN on the water injection multiplier.

To provide for fuel being used by the afterburner in combined cycle applications, signals from blocks 74, 76, and 78 proportional to the afterburner fuel valve settings have the proper gain applied and are summed with the gas turbine MW signal in summer box 80 to provide a total water demand signal. The afterburner signals generally have a small effect on the demand for water injection because the maximum afterburner fuel is 20% of the total and because the combustion temperatures in the afterburners are lower than those in the gas turbines.

Figure 4A:
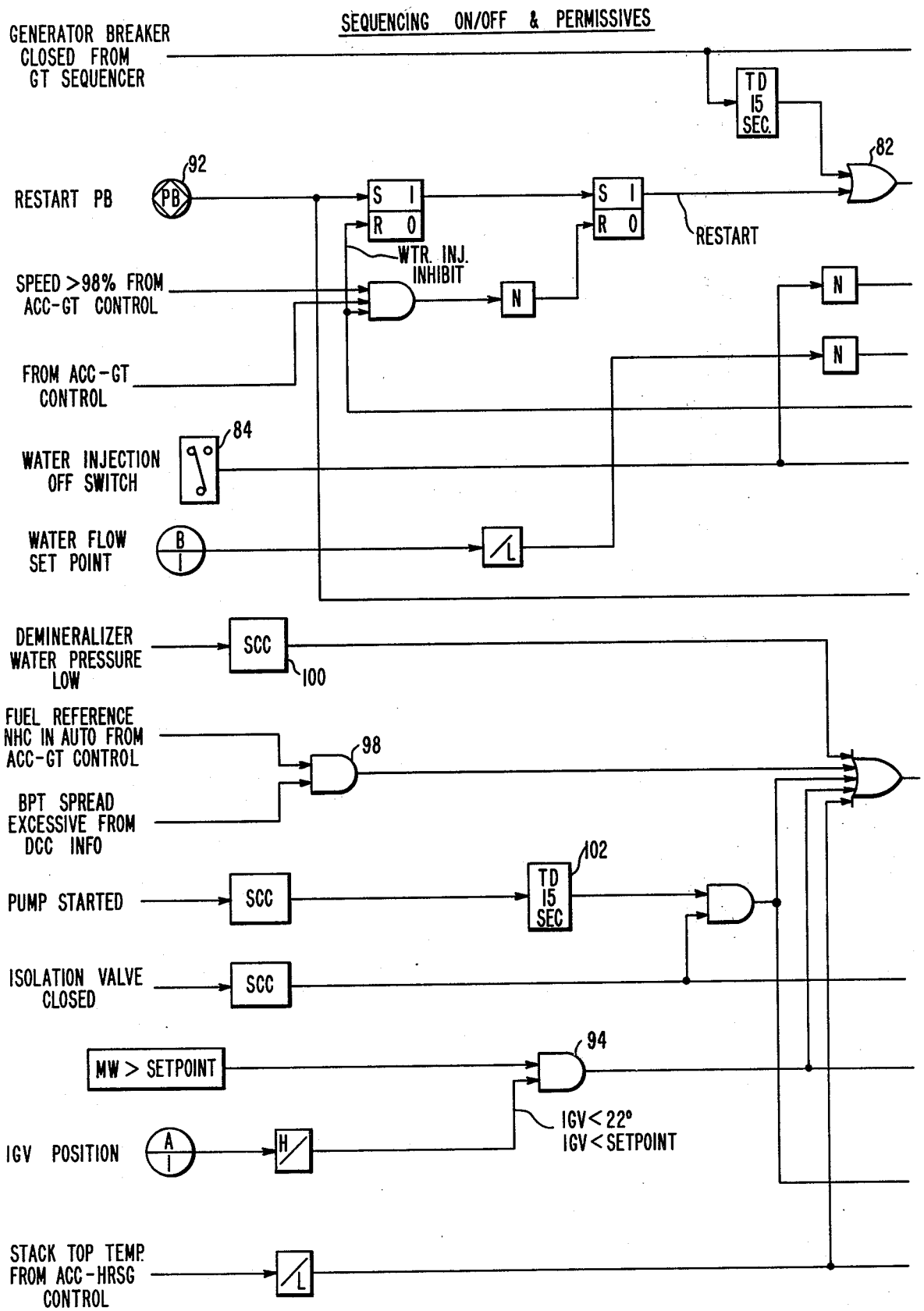
FIGS. 4A–4C show the water injection control in greater functional detail.
Figure 4B:
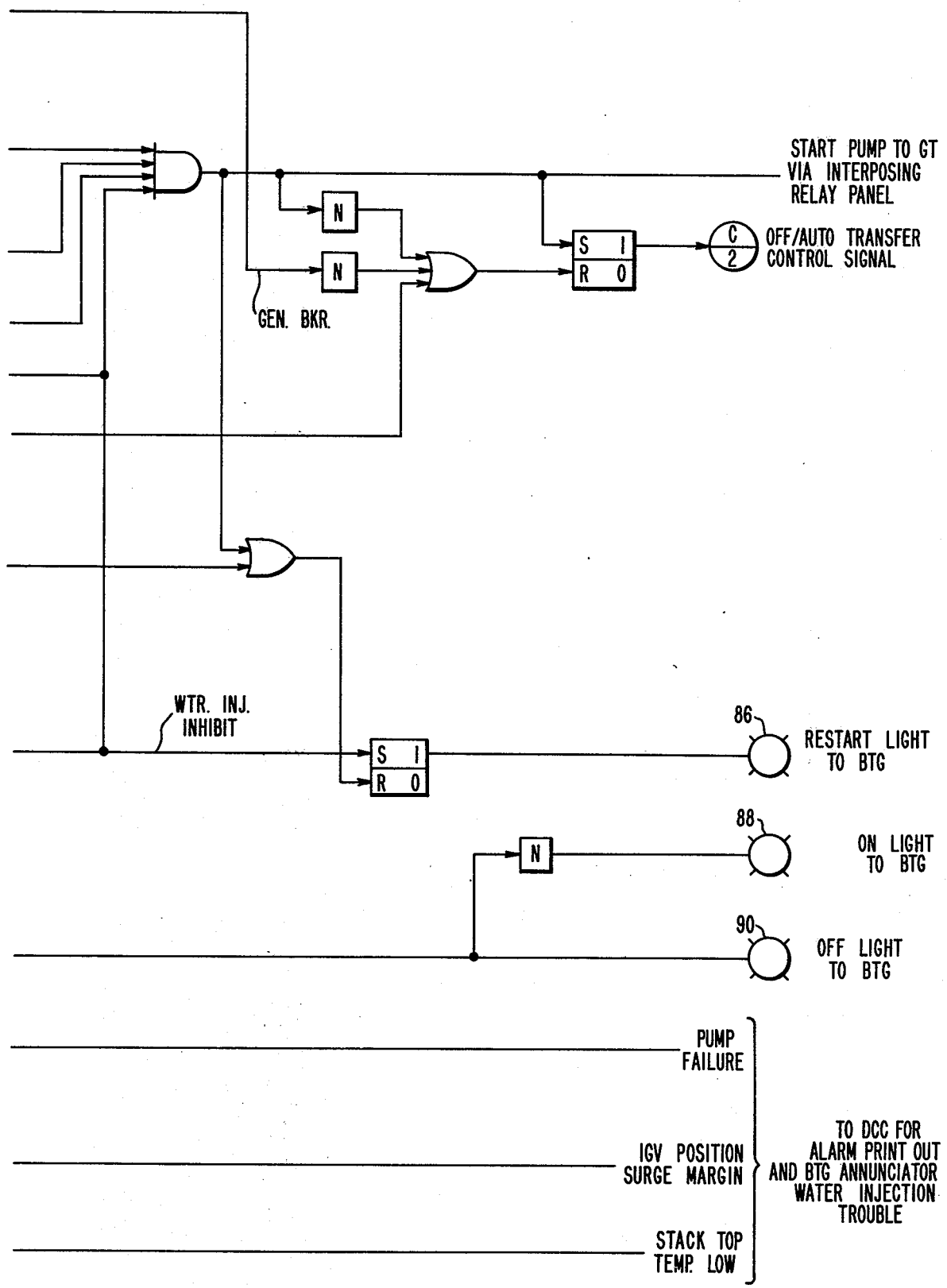
Figure 4C:
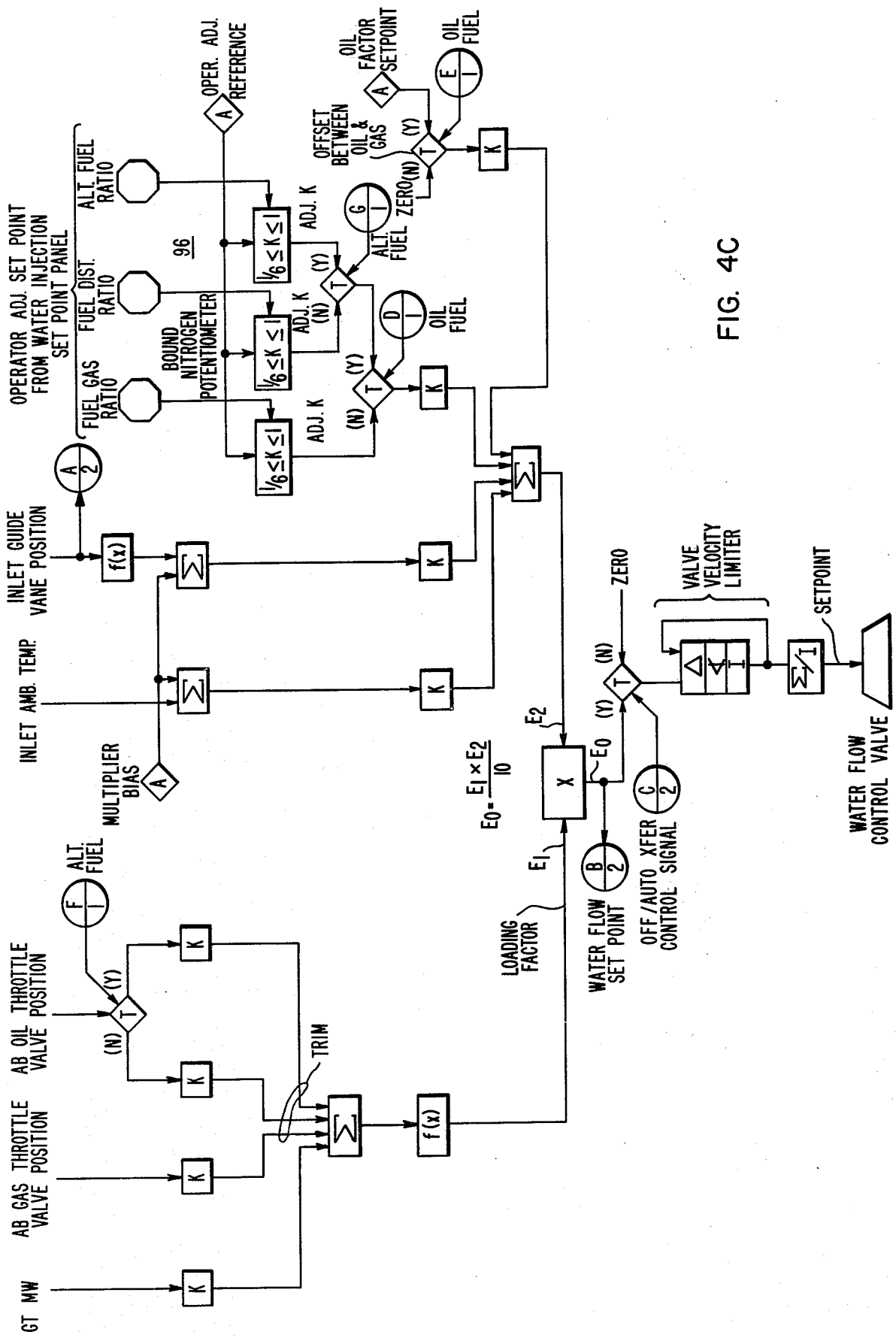

In a detailed embodiment of the invention the following control functions are implemented as diagrammed in FIGS. 4A–4C:

1. Block 82 inhibits automatic operation of water injection prior to generator breaker closure.

2. The BTG panel has a water injection selector switch 84 (off-auto), feedback status lights 86, 88 and 90 (off-on) and a "restart" backlighted pushbutton 92.

3. Compressor Surge Margin Monitor:

If inlet guide means are in the operator analog control level and water injection is in auto, the IGV position will trip water injection if the IGV's are closed more than 22° (see the injection permissive block 94) and a computer alarm message is generated.

4. 100% water flow and bound nitrogen are adjusted by a potentiometer system 96 (FIG. 4C) for choice of fuel: gas, No. 2 oil or alternate liquid fuel.

5. Water injection normal start-stop as well as all large incremental increases in flow setpoint are ramped. Upon start, water setpoint is set at minimum flow and ramped to the required value; upon stop, the setpoint is ramped to minimum flow prior to shutdown.

6. Water injection trips result from any gas turbine trip. Upon trip, no ramp occurs prior to the stop; rather, water injection flow to the turbine is immediately shut off by closing the isolation valve from a signal generated at the gas turbine mechanical skid.

7. Flame Stability Monitor:

16 individual blade path thermocouples are computer monitored during water injection for flame stability. If the temperature spread is excessive, water injection is stopped and a computer alarm message is generated.

8. Gas Turbine Exhaust Temperature Monitor:

Minimum gas turbine average exhaust temperature is monitored as a permissive (see block 98) for water injection for the purpose of preventing gas turbine flame failure and $H_2SO_4$ condensation in the HRSG. Water injection is stopped any time exhaust temperature is below the minimum.

9. A BTG addressable constant for step change of water flow setpoint is provided consistent with afterburner shutdown.

10. Upon detection of low demineralized water pressure (less than 20 psig) the gas turbine water injection is stopped by block 100. This prevents the supply of demineralized water for HRSG makeup from becoming inadequate, when a common demineralized water supply is used.

11. A computer alarm message is generated and water injection is shut off if the water injection pump discharge pressure is below its limit switch setting any time after the water injection pump is started (following a 15 second pump startup delay in block 102).

12. Water Injection Restart:

The operator is allowed to (1) restart (via BTG momentary pushbutton) the automatic water injection system, or (2) start water injection at idle with the gas turbine generator breaker open. Restart is required after:

1. Flame stability water injection trip.
2. Gas Turbines "average exhaust temperature high" water) injection trip.
3. Demineralized water pressure low.
4. Inlet guide vanes are more than 22" closed and in operator analog control.

13. Water injection automatic start occurs after the generator breaker is closed.

14. CSO Limit:

The water injection setpoint is limited to a proportional percent of the fuel control signal output. This protects against excessive water to fuel ratio during severe transients of fuel flow, such as a full load dump.

Figure 3A:
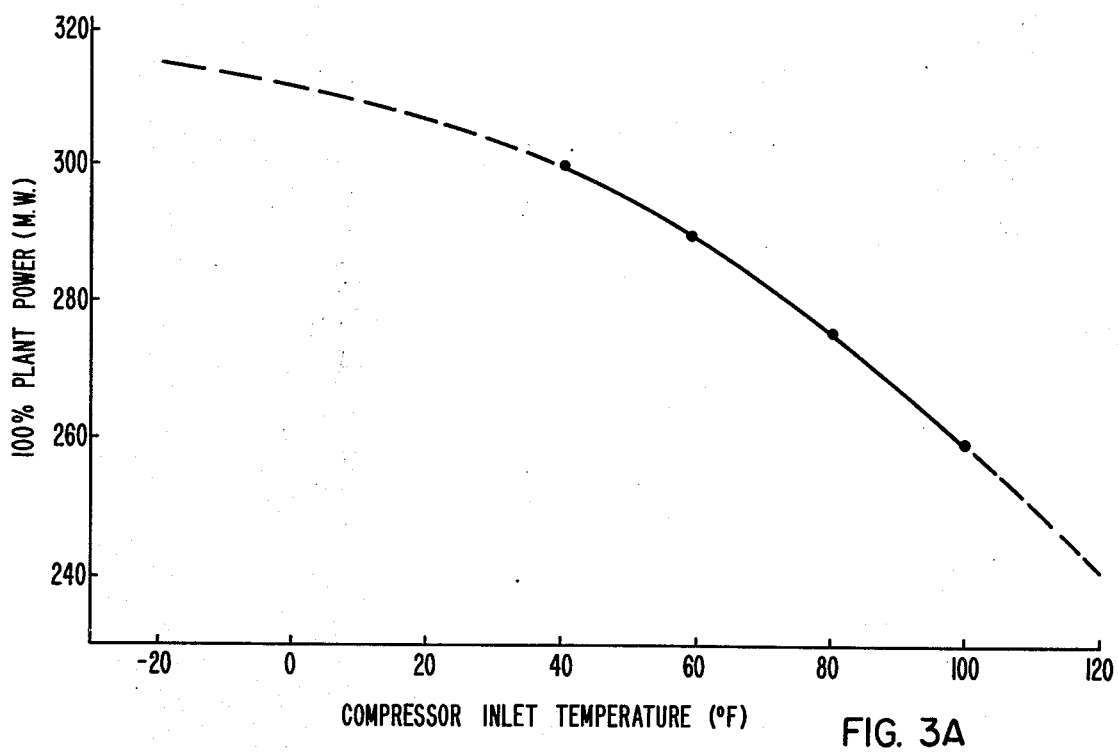
FIGS. 3A–3H show various curves which provide information helpful to understanding the invention.
Figure 3B:
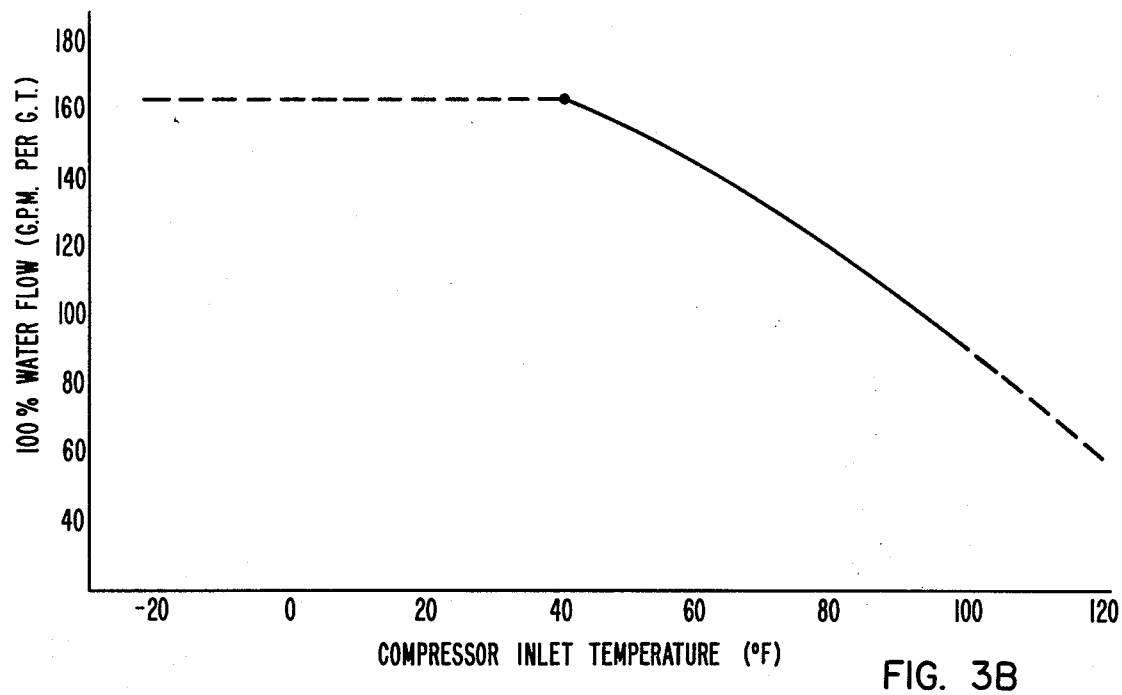
Figure 3C:
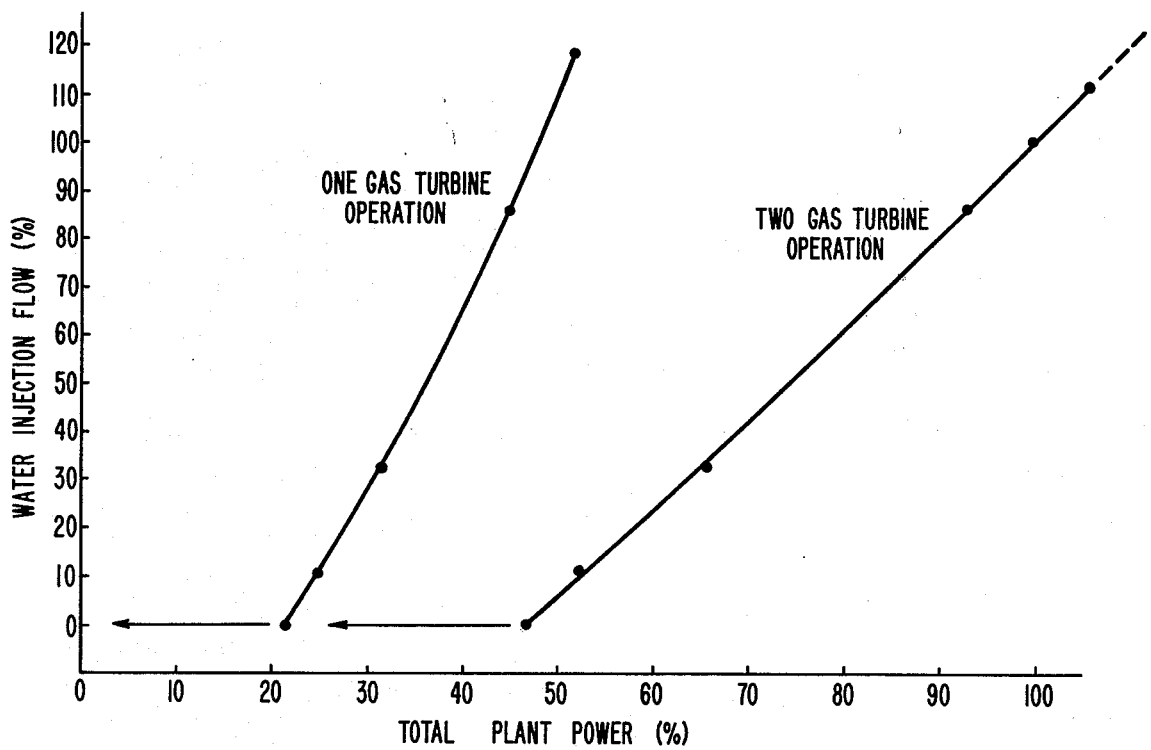
Figure 3D:
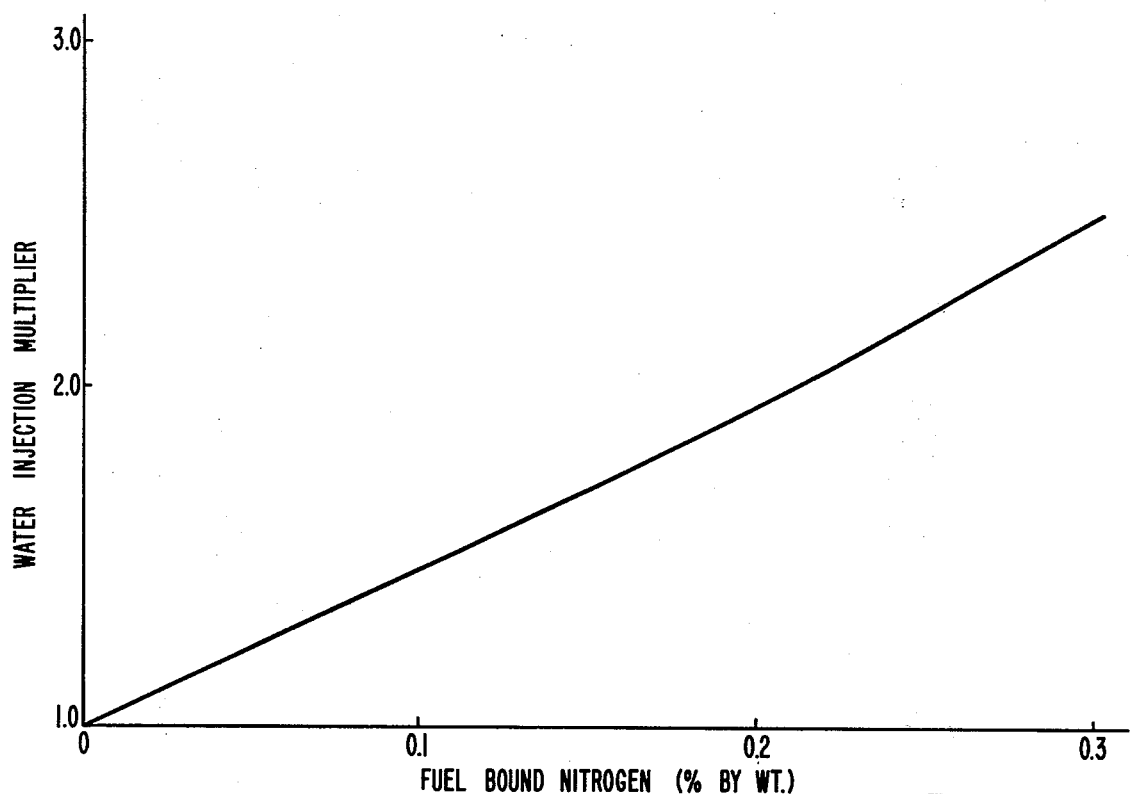
Figure 3E:
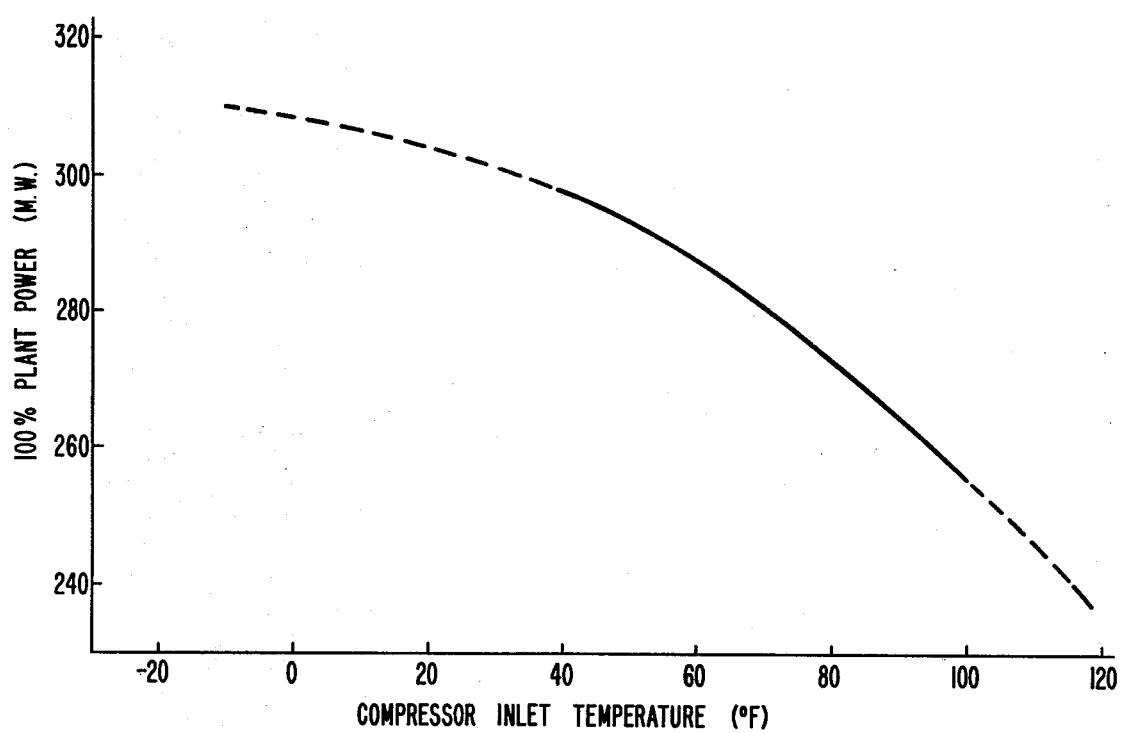
Figure 3F:
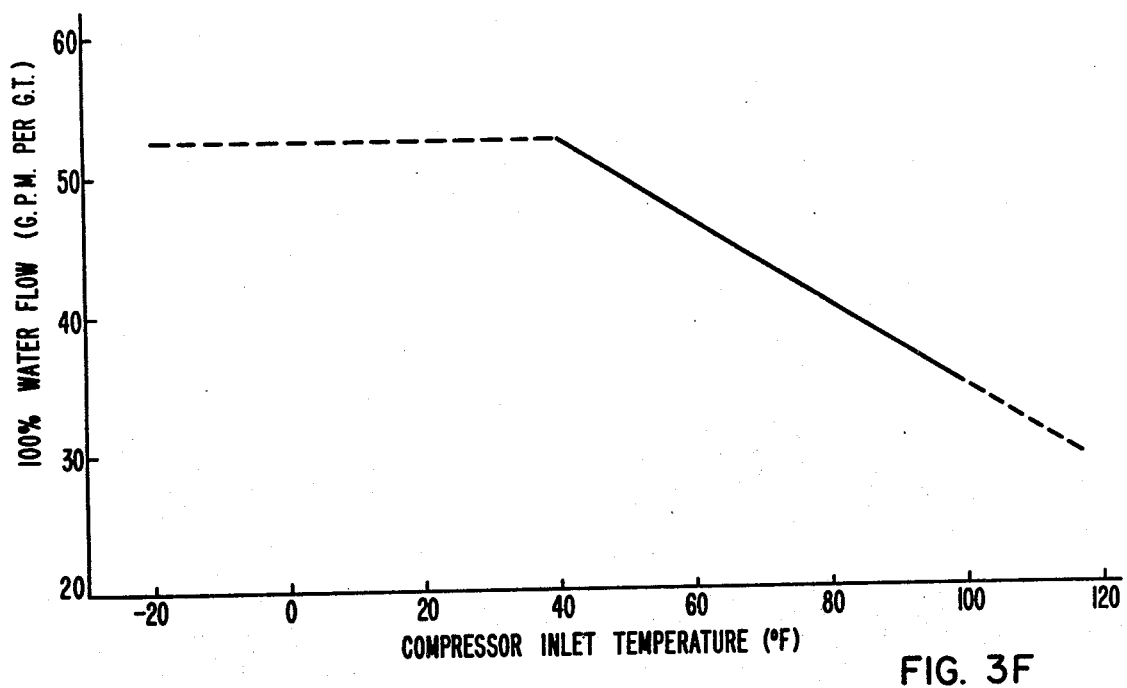
Figure 3G:
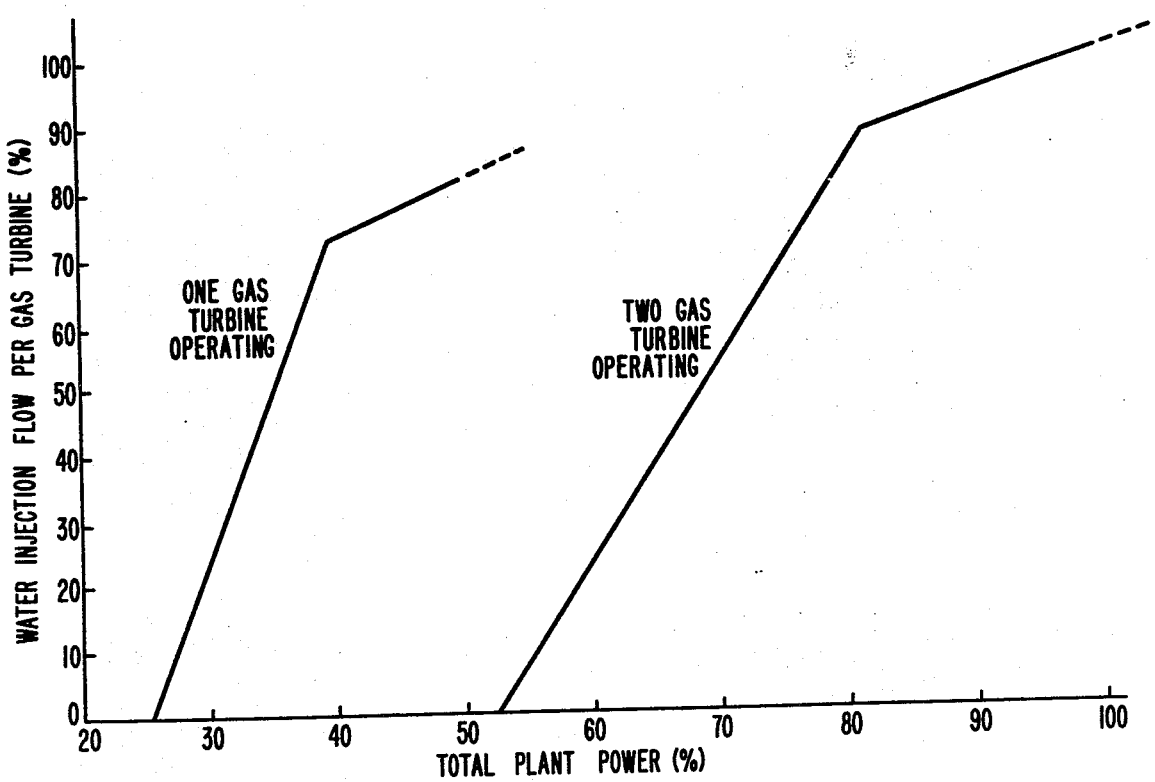
Figure 3H:
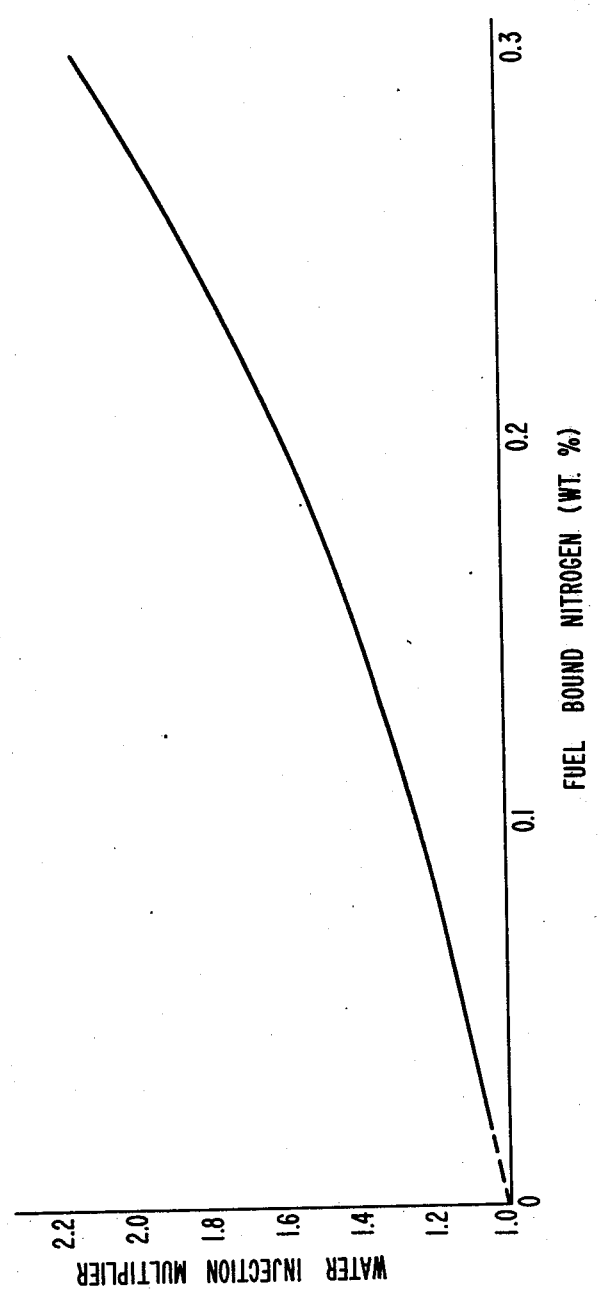

If a computer (not shown) is employed as part of the water injection control, it can calculate 100% plant power (MW) as a function of compressor inlet temperature per FIGS. 3A or 3E. The computer also calculates 100% water flow as a function of compressor inlet temperature and choice of fuel as shown in FIGS. 3B or 3F. Further, the computer calculates nominal water flow setpoint as a function of plant MW reference, 100% plant power, 100% water flow and the number of gas turbines in operation. Reference is made to FIGS. 3C or 3G. Finally, the computer corrects water flow setpoint for bound nitrogen content in the selected fuel.

The following is a representative water injection schedule procedure for a WESTINGHOUSE PACE 260 combined cycle power plant:

Measured Parameters
(1) Total Gross Plant Power (M.W.)
(2) Gas Turbine Compressor Inlet Temp. (°F)
(3) Number of Gas Turbines Operating (1 or 2)
(4) Fuel Bound Nitrogen (% by wt.)
(5) California Rule 67

Performance Curves
(1) 100% Plant Power vs. Compressor Inlet Temp.
(2) 100% Water Injection Flow vs. Compressor Inlet Temp.
(3) % Water Injection Flow vs % Plant Power
(4) Water Injection Multiplier vs. % Fuel Bound Nitrogen

EXAMPLE

| | |
|---|---|
| Fuel Bound Nitrogen | 0.02 Wt. % |
| Measured Total Plant Power | 240 M.W. |
| Measured Compressor Inlet Temp. | 80° F. |
| Two Gas Turbines Operating | |
| Use curves in FIGS. 3A–3D | |

Step 1: Read the 100% Power and 100% Injection flow from FIGS. 3A and 3B respectively:
100% Power = 275 M.W.
100% Injection = 118 G.P.M.

Step 2: Calculate percent power at which the plant is operating and read percent water injection from FIG. 3C.

$$\% \text{ Plant Operating Power} = \frac{(240)(100)}{275} = 87.3$$

% Water injection flow = 74.5

Step 3: Calculate water injection flow per gas turbine.
Injection flow = (0.745)(118) = 87.9 G.P.M.

Step 4: Correct water injection flow for fuel bound nitrogen. Read multiplier from FIG. 3D and calculate corrected injection flow.
Multiplier = 1.08
Injection flow =
(87.9)(1.08) + (% Fuel Bound Nitrogen)(K) G.P.M.
= (87.9)(1.08) + (0.02)(170)
= 94.9 + 3.4 = 98.3 G.P.M.
K = 170 for California Rule 67
K = 100 for E.P.A.

The above steps can be executed by and large by on-line computer operations or as disclosed herein by reflection in the design parameters of hardwired functional blocks.

In operation, the invention provides for using an optimum amount of demineralized water while limiting NOx generation thereby keeping the operating cost to a minimum. Adjustments needed to optimize each installation are separate for thermal NOx and Organic NOx. The Water Flow setpoint signal is increased slowly and decreased rapidly to provide good flame stability. Water requirements for the afterburner are added in such a way that the same system can be used for gas turbine installations with or without afterburners. Further, the water control subsystem is a stand alone system that can be added to new or existing gas turbine control systems. As already indicated, software versions of the invention may be employed if desired.

What is claimed is:

1. An electric power plant comprising a gas turbine which drives an electric generator, a system for supplying fuel to combustors included as a part of said turbine, means for controlling the fuel flow to said combustors to control the turbine speed and load, a system for injecting varying amounts of water into said combustors to control the level of NOx emission, and means for controlling said water injecting system to vary the amount of injected water and limit the NOx emissions as a function of a representation of the load and a representation of the combustor mass air flow including a representation of the position of inlet guide vanes provided for said turbine.

2. A power plant as set forth in claim 1 wherein means are provided for varying the amount of water injected by said water injecting controlling means further in accordance with the nitrogen content of the fuel being used.

3. A power plant as set forth in claim 1 wherein means are provided for varying the amount of water injected by said water injecting controlling means further as a function of mass air flow as represented by the inlet ambient air temperature.

4. A combined cycle electric power plant comprising at least one gas turbine having combustor means which exhausts through an afterburner to a heat recovery steam generator, a steam turbine driven by steam supplied by said steam generator and respective electric generators driven by said gas stream turbines, a system for supplying fuel to the turbine combustor means and to said afterburner, means for controlling the fuel flow to said combustors to control the turbine speed and load, a system for injecting varying amounts of water into said combustors to control the level of NOx emission, and means for controlling said water injecting system to vary the amount of injected water and limit the NOx emission as a function of the load and further as a function of the fuel being supplied to said afterburner.

5. A combined cycle plant as set forth in claim 4 wherein means are provided for varying the amount of water injected by said water injecting controlling means further in accordance with the nitrogen content of the fuel being used.

6. A combined cycle plant as set forth in claim 4 wherein means are provided for varying the amount of water injected by said water injecting controlling means further as a function of the mass air flows as indicated by the position of inlet guide vanes provided for said turbine and the inlet ambient air temperature.

* * * * *